United States Patent [19]

Shatto

[11] 4,025,895
[45] May 24, 1977

[54] NAVIGATION SYSTEM FOR MANEUVERING A STRUCTURE ABOUT A SUBMERGED OBJECT

[75] Inventor: Harry Howland Shatto, Laguna Beach, Calif.

[73] Assignee: Sante Fe International Corporation, Orange, Calif.

[22] Filed: Sept. 18, 1975

[21] Appl. No.: 614,734

[52] U.S. Cl. .............................. 340/3 R; 340/3 T; 340/3 F
[51] Int. Cl.² ......................................... G01S 9/68
[58] Field of Search ........................... 340/3 R, 3 T

[56] References Cited

UNITED STATES PATENTS

| | | | |
|---|---|---|---|
| 2,972,731 | 2/1961 | Beebe | 340/3 R |
| 3,005,973 | 10/1961 | Kietz | 340/3 R |
| 3,222,634 | 12/1965 | Foster | 340/3 R |
| 3,803,541 | 4/1974 | Shiroyama et al. | 340/3 R |

Primary Examiner—Richard A. Farley
Attorney, Agent, or Firm—Michael P. Breston

[57] ABSTRACT

The navigation system permits remote maneuvering of a water-borne structure about a stationary object by utilizing dual sonar ranging. The structure can be self-propelled or towed by a surface craft. The transducer portion of the navigation system is mounted on the structure and the system's remaining portion is on the deck of the surface craft. For complete remote navigation, at least three but preferably four transducers are employed for positioning at the four corners of a rectangle. Each transducer is both sound-emitting and sound-receiving. The sonic impulses from each pair of port and starboard transducers are directed downwardly and inwardly. The travel time for each reflected sonic impulse is directly proportional to the slant range between the transducer and the object. The spacing between each pair of port and starboard transducers and the frequency of the emitted sound impulses are selected so that very accurate measurements are obtainable of the position of the object relative to the transducers. If the object is a pipe it is desirably maintained on a visual display in a longitudinal plane of symmetry for the two pairs of transducers. Any appreciable lateral deviation from the desired position is immediately detected and corrective action can be taken by the surface craft to reposition the structure.

12 Claims, 10 Drawing Figures

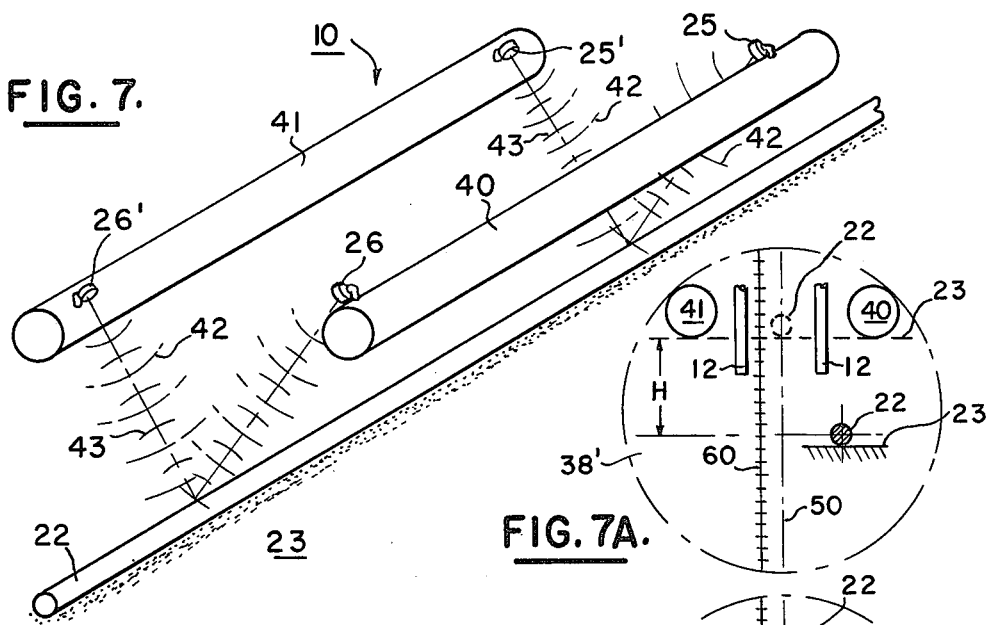
FIG. 7.
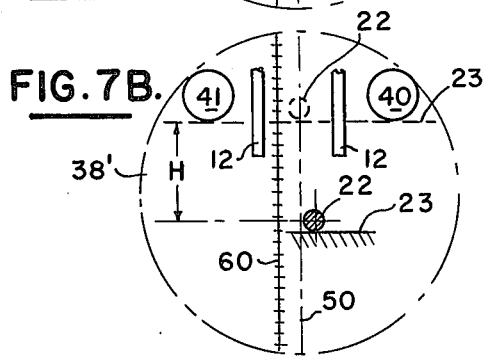
FIG. 7A.
FIG. 7B.
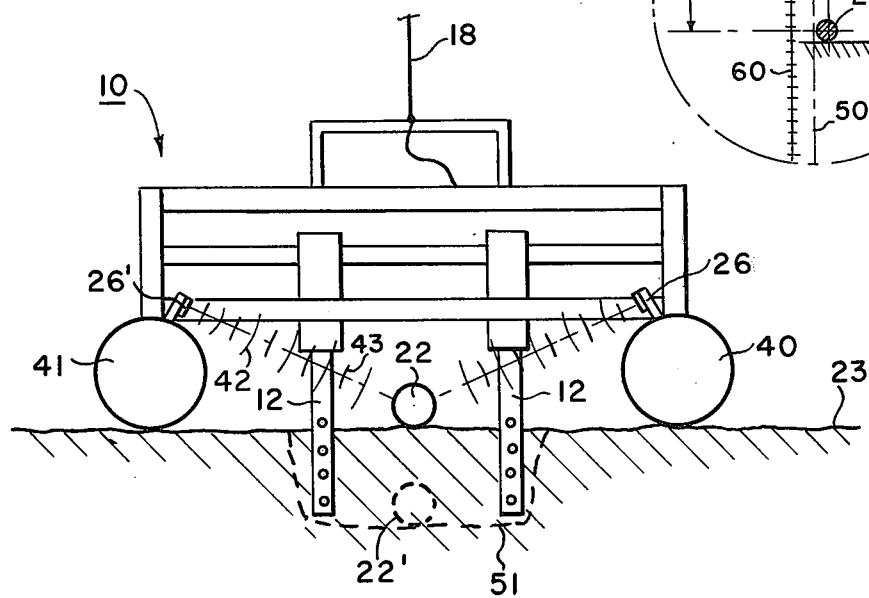
FIG. 8.

NAVIGATION SYSTEM FOR MANEUVERING A STRUCTURE ABOUT A SUBMERGED OBJECT

FIELD OF THE INVENTION a. This invention generally relates to piloting waterborne structures.

b. In particular, this invention relates to remotely piloting a pipe burying sled.

BACKGROUND OF THE INVENTION

When it is desired to do work on a submerged object whose location is unknown, with a movable waterborne structure, the common present practice is to use divers to first locate the object and then to maneuver the structure about the object. For example, the structure can be an underwater pipeline trenching machine mounted on a sled which is towed by a surface craft. The trenching machine digs a trench and allows the pipeline to settle at the bottom of the trench, which is subsequently covered with material from the ocean floor. The present practice is to send divers down to the seabottom who by voice communication first assist the surface craft in setting astride the sled over the pipeline and then assist the craft in guiding the sled along the path of the pipeline as the digging of the trench progresses.

Since the present tendency is to bury pipelines at deeper and deeper water depths, the divers will become exposed to greater and greater water pressures. Also, in relatively shallow waters, any turbidity or murkiness in the water greatly reduces a diver's field of vision, say to a few inches. Attempts have been made to use underwater television cameras with diver assistance, but the range of vision of such cameras can also become very limited.

Accordingly, it is a broad object of this invention to provide, by means of dual sonar slant ranging, a continuous visual representation of the position of the sled with respect to the piepline and the seabottom, without diver assistance and/or use of television cameras.

Methods are generally known for acoustically surveying underwater. One such method employs dual side scan sonar which typically comprises five major components: a transceiver, a split-trace programmer, a graphic recorder, a tow cable, and a towed vehicle carrying two transducers.

The transceiver contains a transmitter as well as a receiver. The transmitter generates a short burst of electric energy which is carried to the transducers via the cable. Each transducer changes the burst of electric energy into a directional acoustic pulse which is radiated out into the water in a fan-shaped beam. The transmitted acoustic beams from the pair of transducers are consecutively directed downwardly but away from each other. Each acoustic beam is reflected from the seabottom and from any hard object lying in the path of the beam. The same transducer which emits the acoustic impulse is used to detect its reflected beam or echo and to convert it into an electric pulse which is transmitted via the tow cable back to the receiver section of the transceiver.

The programmer generates key pulses into the transceiver. The key pulses control the channels of transmission. The programmer also blanks out undesired signals and noise which are present on the channel which is not in use, so that when transmitting and receiving from one transducer, signals from the other transducer will not be recorded.

The tow cable combines tensile cables with a core of electric conductors coupling the transducers to the transceivers.

The recorder produces visual records of the sonar survey which are usually qualitative.

A commercially available dual side scan sonar system of the foregoing type is available from Ocean Reserach Equipment, Inc., of Falmouth, Mass.

It is another object of this invention to utilize the technology developed in connection with side scan sonar systems in a novel manner and for a novel use consisting of maneuvering underwater a structure relative to a stationary, sound-reflecting object.

It is a further object of this invention to provide a sonic navigation system for installation directly on a remotely-piloted, water-borne structure. The navigation system may be used (1) to locate the stationary object, such as a pipeline, at ranges up to 350 and more meters, (2) to orient and position the structure precisely with respect to the pipeline in both the vertical and horizontal directions, and (3) to guide the structure in its movement relative to the pipeline.

SUMMARY OF THE INVENTION

The invention provides a method and apparatus for remotely maneuvering a water-borne structure about a stationary object by utilizing a novel dual sonar ranging navigation system. The structure can be maneuvered remotely with the aid of a surface craft on the deck of which is disposed the main portion of the navigation system. The transducers and other auxiliary components of the system are mounted on the structure. For complete remote maneuverability, at least three but preferably four directional transducers are positioned at the four corners of a rectangle. The bow and stern pairs of port and starboard transducers consecutively emit sonic impulses which are directed downwardly and inwardly. While the structure is moved toward and astride of the object, the relative positions of the transducers are being continuously monitored and measured on visual displays on the deck of the surface craft. Thus, the navigation system can be used to locate the object, position the structure astride of the object, and navigate the structure about the object without the use of diver assistance and or television cameras.

In practicing the method of this invention in connection with a pipe burying sled, the pipe is located by piloting, at say 20 to 60 meters above the bottom 23, the water-borne sled and by simultaneously and consecutively transmitting and receiving sonic impulses with one pair of transducers until the pipe is detected by at least one transducer. The sled is then moved toward the pipe until the slant ranges from both transducers are substantially equal. Then the sled is lowered to an altitude of say 5 to 10 meters above bottom 23 and all four transducers are activated. The sled is maneuvered until the slant ranges produced by all four transducers are substantially equal. Then the sled can be safely disposed on the seabottom astride of the pipe. Thereafter, the operation of only the front pair of transducers is required to guide the sled on the seabottom along the pipeline.

BRIEF DESCRIPTION OF THE DRAWINGS

FIG. 7 is a schematic view in perspective of the centering of both ends of the sled over the pipeline;

FIGS. 7A and 7B are cathode ray tube displays, respectively showing the position of the front and rear ends of the sled relative to the pipe, useful for the centering process depicted in FIG. 7; and FIG. 8 illustrates the position of the sled relative to the pipe while the pipe is being buried by the trenching machine mounted on the sled.

DESCRIPTION OF PREFERRED EMBODIMENTS

While this invention is generally adapted for maneuvering a water-borne structure about a stationary, sound-reflecting object, the invention will be illustrated and described with reference to one application thereof, that of remotely maneuvering a pipe-burying sled used to excavate a ditch under a pipeline on the seabottom for the purpose of burying same.

Figure 1:
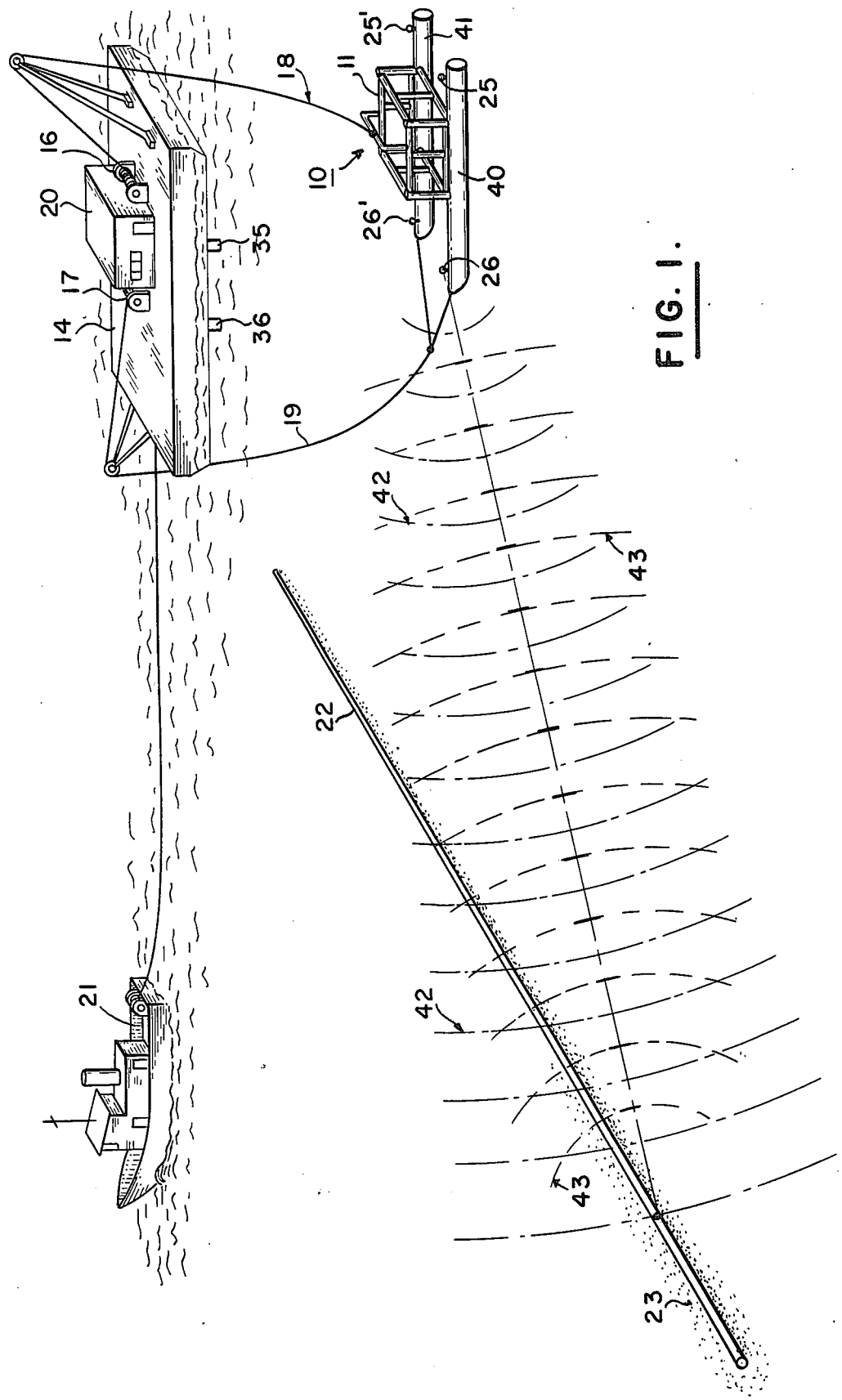
FIG. 1 is a schematic perspective view of the equipment employed for remotely maneuvering a sled relative to a pipeline in accordance with this invention.

Referring now to the the drawings, there is shown a pipe burying sled, generally designated as 10, carrying trench cutting jets 12. The sled can be self-propelled but typically is remotely maneuvered by a surface craft such as a barge 14. Barge 14 is typically towed by a tow boat 21. Mounted on the deck of barge 14 are winches 16, 17 whose tow lines 18, 19 respectively are coupled to the superstructure 11 of the sled as shown in FIG. 1. The superstructure 11 is mounted on two parallel pontoons 40, 41.

In the operating room 20 on the deck of barge 14 is disposed a portion (which is above the dotted line L in FIG. 2) of the sonar navigation system 24 of the present invention. The complete sonar navigation system 24 includes at least three but preferably four transducers arranged in two pairs: port-and-starboard stern transducers 25, 25' and port-and-starboard bow transducers 26, 26'. The tow cable 18 carries in addition to tensile members a core consisting of conductors 27, 27', 28 and 28'. Conductors 27, 27' connect transducers 25', 25' to a transceiver 31. Conductors 28, 28' connect transducers 26, 26' to a transceiver 32. Each transceiver is connected to a split trace programmer 37 which is coupled to a cathode ray tube (CRT) 38, having a display 38', which is coupled to a graphic recorder 39.

Each transducer is of the piezoelectric ceramic type designed to operate in a directional manner and at a high frequency. For the requirements of the pipe burying sled 10, an operating frequency of about 100 kH is sufficient. Each transducer is used both to transmit acoustic impulses and to receive the reflected acoustic impulses or echoes therefrom. Each transducer is housed in a metal housing of sufficient structural integrity to fully protect its transducer. Each such housing is so mounted on the pontoons 40 and 41 of sled 10, and each transducer is so constructed that the acoustic impulses transmitted by each pair of port and starboard transducers 25, 25' or 26, 26' are directed mostly downwardly and inwardly toward the center of the sled, as can be seen best from FIG. 6.

Each downwardly transmitted impulse 42 produces a reflected acoustic impulse or echo 43. The acoustic impulses produced by each one of each pair of port and starboard transducers will be generated sequentially so that their respective return echoes would not interfere with one another. In other words, no two transducers are operated simultaneously. Transducers 25, 25' are driven by the transmitter portion of transceiver 31. Transducers 26, 26' are driven by the transmitter portion of transceiver 32. The acoustic impulses detected by transducers 25, 25' are transmitted to the receiver portion of transceiver 31. The acoustic impulses detected by transducers 26, 26' are transmitted to the receiver portion of transceiver 32.

Figure 2:
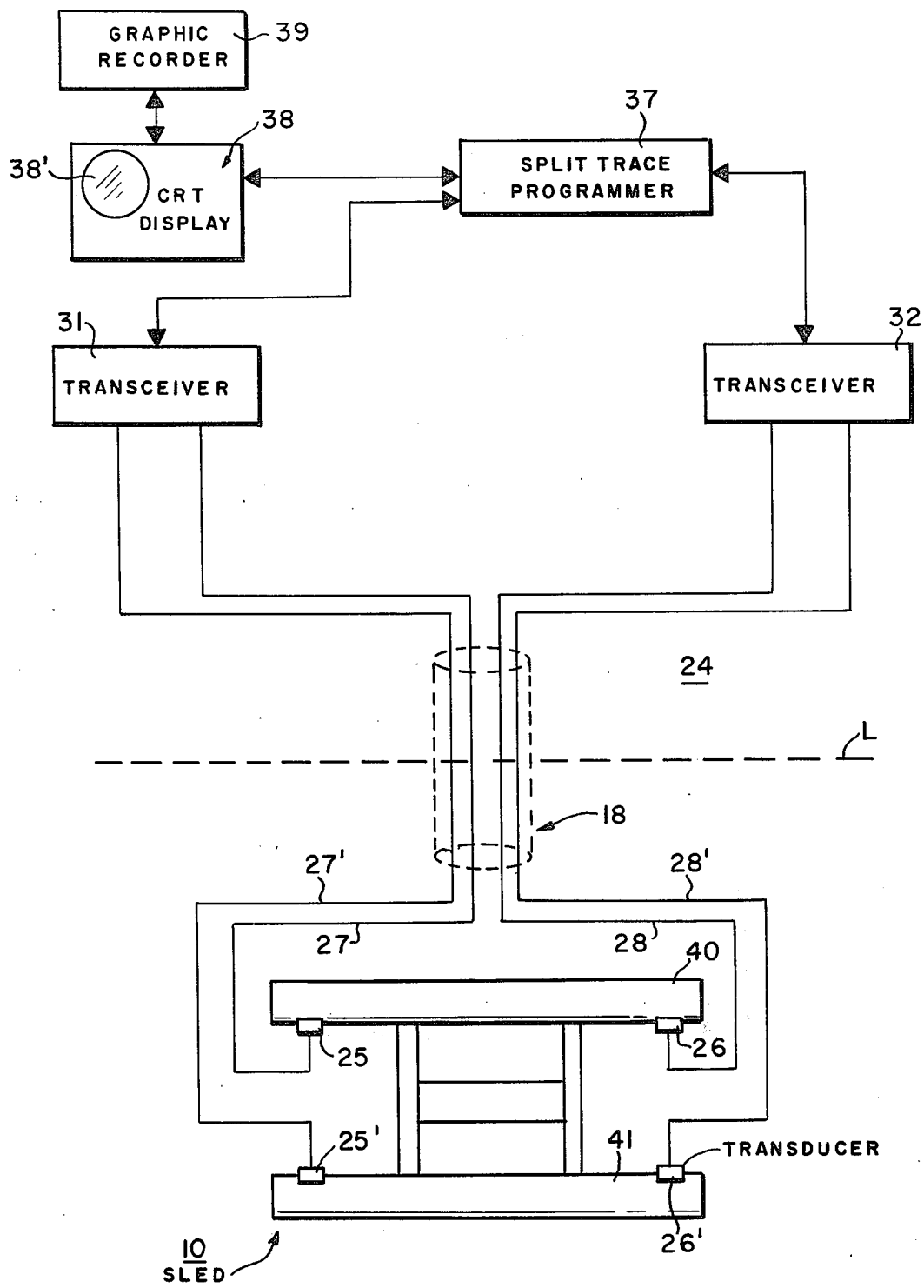
FIG. 2 is a schematic block diagram representation of the dual sonar ranging navigational system employed in FIG. 1.

Transducers 25, 25', 26, 26' are disposed at the four corners of a rectangle on sled 10, as best shown in FIGS. 2 and 7. The separation (known as aperture) between each pair of port and starboard transducers is sufficiently great, compared to a wave length of the operating sonar frequency, so as to permit the desired resolution and accuracy of measurement. In one embodiment, the lateral separation between transducers 25, 25' was 26 feet, and the longitudinal separation between transducers 25 and 26 was 40 feet. With the above given dimensions, the accuracy of the sonar slant ranging was on the order of a few inches.

The split trace programmer 37 controls the time and channel (port or starboard) of transmission in transceivers 31 and 32. While only one split trace programmer 37 is shown for both transceivers 31, 32, it may be desired to provide a separate split trace programmer for each transceiver. The transmitter section of the transceiver accepts key signals from the programmer at a precisely determined repetition rate. Each key signal is a fixed frequency square wave which drives the transmitter. The transmitter generates a short electric impulse which is carried consecutively to the transducers coupled thereto.

Each transducer changes the received electric impulse into an acoustic impulse which is radiated out into the water in a fan-shaped beam. Each transmitted acoustic impulse is reflected from any reflecting medium within its path. Most of the transmitted acoustic energy passes through the earth-water interface 23 and becomes attenuated therein. A portion of the transmitted acoustic energy is reflected from the earth-water interface 23 and from any other sound-reflecting object which may lie in the path of the transmitted beam.

Thus, a reflected acoustic impulse from a pipe made of metal or plastic will have a greater intensity than a reflected acoustic impulse from a relatively soft seabottom 23. The time of arrival of each reflected impulse or echo from the pipe to the transducer is directly proportional to the distance therebetween. The continuous measurement of the times of arrival of these echo impulses gives rise to time echo ranging. Since the travel time is directly proportional to the distance traveled by the echoes, the time measurements can be converted into distance measurements, and, therefore, the time echo ranging can be converted into slant echo ranging.

The detected signals are transmitted by transceivers 31, 32 to programmer 37 which suitably conditions the signals for display by the cathode ray tube 38 and the graphic recorder 39. The graphic recorder 39 has a pen (not shown) which makes an impression on paper according to the intensity of the received electric impulse. The pen writes across a sheet of paper, and a clock mechanism advances the paper underneath the pen.

Figure 6:
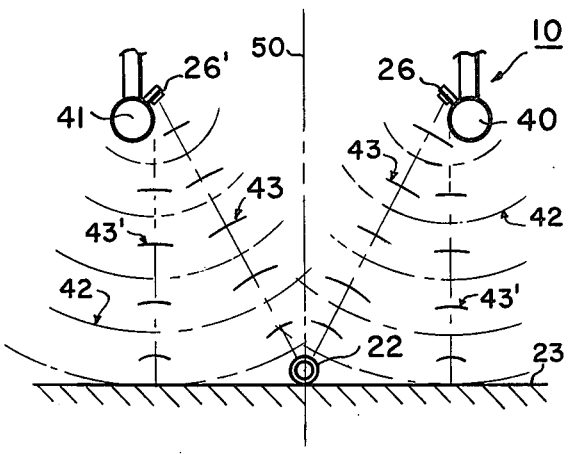
FIG. 6 shows the front end of the sled alrady astride of the pipeline.

The outputs from each pair of port and starboard transducers 25, 25' and 26, 26' are recorded on the same sheet of paper but on the opposite sides of a centerline, which represents the direction of tow or the longitudinal plane or symmetry 50 of sled 10 (FIG. 6). Recorder 39 can include two graphic recorders, one for each transceiver, or one recorder that is shared by both transceivers. Thus, the slant ranges can be measured from the sheet of paper, that is the display of graphic recorder 39, wherein a sound reflector, such as a submerged pipe 22, is easily distinguishable by virtue of its darker trace on the paper of the recorder.

Part of the acoustic impulses 42 travel vertically downwardly to the seabottom 23 and are reflected upward as echoes 43'. These echoes 43' will be the first ones to arrive and, therefore, will produce on recorder 39 a trace which is darker and closer than any other position of bottom 23. From this darker trace the vertical distance H of the transducer such as transducer 26, to the seabottom 23 can be determined. Since transducer 26 is mounted on sled 10, the measured vertical distance H is the altitude of the sled.

The cathode ray tube displays 38' (FIGS. 7A, 7B) show the bow and stern positions of the sled relative to the pipe 22 in X-Y coordinates. The altitude of the sled 10 can be displayed on the CRT with reference to a vertical scale 60 on CRT display 38'.

GENERAL DESCRIPTION OF OPERATION

The operation of the dual range sonar navigation system will now be more fully explained with reference to locating the pipe 22 and positioning the sled on the sea floor astride of the pipe.

At the start of the operations, the general vicinity of pipe 22 on the sea bottom 23 is known. Therefore, barge 14 is moved to this known vicinity and the sled is lowered into the body of water on lines 18, 19 to an altitude $H_1$ (FIG. 3), say between 20 and 50 meters above the sea bottom. The navigation system 24 is energized to the extent of supplying electric pulses to the transmitter section of transceiver 32 which feeds the port-and-starboard bow transducers 26, 26'. Each transducer emits a directional acoustic impulse 42. It will be noted from FIG. 3 that pipe 22 is out of range for the acoustic beam 42 transmitted by transducer 26' but it is within range to be detected by the acoustic beam 42 transmitted by transducer 26. The vertical range between transducer 26 and pipe 22, or the altitude of sled 10, and the slant range between transducer 26 and pipe 22 is provided by graphic recorder 39.

Figure 3:
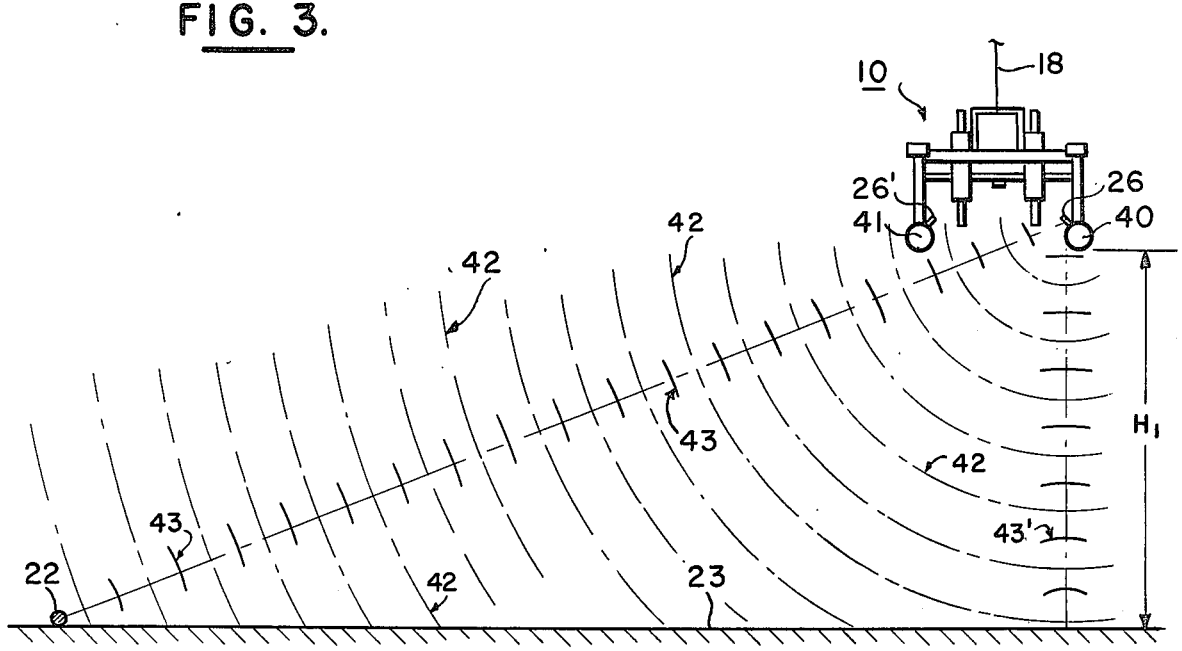
FIG. 3 illustrates the start of the search for the pipeline.
Figure 4:
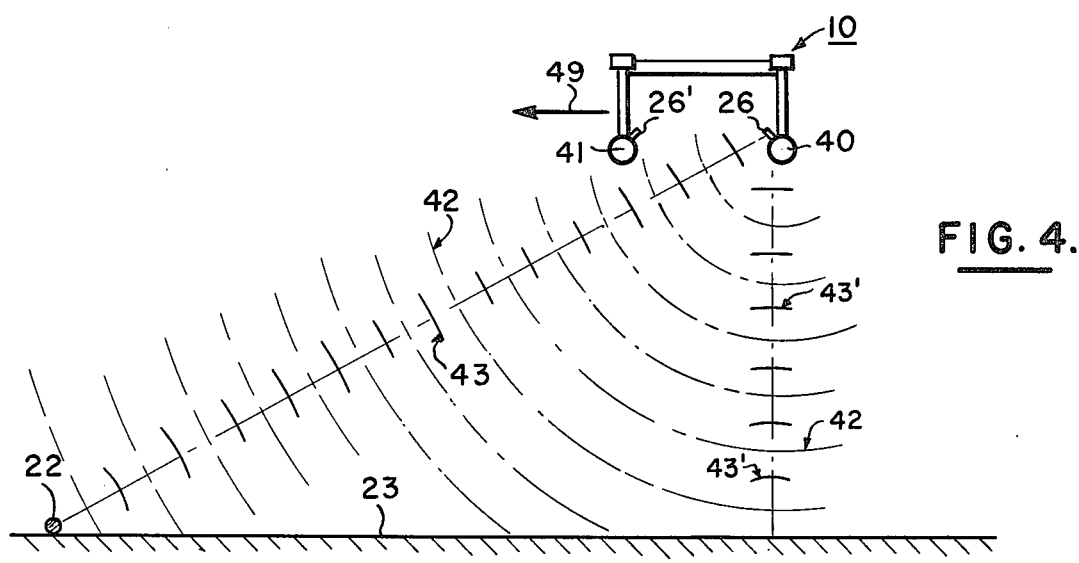
FIG. 4 illustrates the movement of the sled toward the pipeline.

Sled 10 is moved by barge 14 in the direction of arrow 49 (FIG. 4) so as to reduce the measured slant range until it becomes substantially equal to altitude $H_1$ (FIG. 3). While moving sled 10 in the direction 49, the transmitted beam from transducer 26' will eventually start to intercept pipe 22 and to provide its own slant range measurement on the recorder 39. It is desired to make the slant ranges provided by transducers 26, 26' substantially equal.

Figure 5:
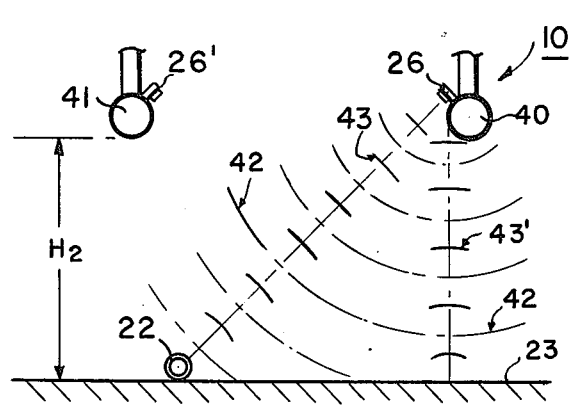
FIG. 5 illustrates the initial phase of the positioning of the front end of the sled astride of the pipeline.

When they do become nearly equal, sled 10 is lowered to an elevation $H_2$ which may be between 5 and 10 meters (FIG. 5). Then, both pairs of port and starboard transducers 26, 26' and 25, 25' are energized. One pair of transducers is energized after the other pair of transducers. Sled 10 is maneuvered so that the slant ranges $H_2$ provided by all four transducers are substantially equal (FIGS. 6 and 7). When that happens, the longitudinal plane of symmetry 50 of the sled will contain the longitudinal axis of the pipeline 22 (assuming the pipe under the sled to be substantially straight).

The measurements from the recorder 39 will be displayed on the CRT displays 38' shown in FIGS. 7A and 7B. These displays can be conveniently used to obtain information for maneuvering sled 10 so as to bring about the desired centering of the sled astride of the pipeline 22. FIG. 7A is a CRT display 38' of the bow of sled 10, and FIG. 7B is a CRT display 38' of the stern of the sled. On each display, reference images of the cutting jets 12, pontoons 40, 41, pipe 22 and seabottom 23 are produced. Altitude measurements can be made with reference to the vertical scale 60. Thus, the altitude H of the sled from the bottom can be measured off scale 60, as shown. The latitude of the sled can be measured off a similar horizontal scale (not shown), which provides the distance of the sled's plane of symmetry 50 from pipe 22.

The sled is maneuvered so that the actual positions of the pipe 22 and of the sea bottom 23 coincide respectively with the dotted line or reference positions 22 and 23 (FIGS. 7A and 7B). When that happens the sled will rest on the sea bottom 23 with the pipe 22 positioned between jets 12 (FIG. 8). This completes the acquisition of the pipe 22 by the sled 10.

The trenching mechanism is now ready to dig a trench 51 in the seabottom 23 for the purpose of burying the pipe therein to a level 22' shown in dotted lines (FIG. 8). To monitor the position of the sled along the pipeline as the ditch is being progressively made, the energization of the bow transducers 26, 26' will be sufficient. Any detected deviation of sled 10 relative to the pipe 22 will be indicated on the CRT displays 38'. Corrective action can then be taken by barge 14 to re-center the sled relative to the pipe.

After the jetting mechanism 12 is lowered around the pipe and the jetting action begins, it was found that the trenching operation does not appreciably interfere with the slant ranging measurements made by the port and starboard transducers 26, 26' of the navigation system 24.

It will be especially appreciated that mounting each pair of port and starboard transducers so that their acoustic beams are directed downwardly and inwardly makes it possible to localize the pipe to a very narrow spot whose latitude and altitude positions can be accurately determined even at great depths with the present invention.

What is claimed is:

1. A method of locating a submerged acoustic reflecting object and maneuvering a water-borne structure about said object, comprising:
   a. mounting two pairs of transducers stations on said structure;
   b. transmitting acoustic impulses from one pair of transducers;
   c. detecting with said one pair of transducers the resultant reflected acoustic impulses;

d. using a characteristic of the detected impulses to locate said object and to move said structure toward said object;
e. transmitting acoustic impulses from the other pair or transducers;
f. detecting with said other pair of transducers the resultant reflected acoustic impulses;
g. constructing a two-dimensional display based on the detected impulses from both pairs of transducers; and
h. using the display to maneuver said structure about said object.

2. The method of claim 1 wherein said transducers are arranged at the four corners of a rectangle; and the acoustic impulses from each pair of port and starboard transducers are directed downwardly and inwardly toward each other.

3. A method of maneuvering a water-borne pipe burying sled about a pipeline laying on the seabottom, said sled including two spaced-apart elongated pontoons, comprising the steps of:
a. mounting a transducer near each end of each pontoon;
b. positioning on a surface craft a dual ranging sonar navigation system;
c. coupling the system to said transducers;
d. towing the sled with said craft to the suspected vicinity of said pipeline;
e. applying electric waves to at least two of said transducers to cause the transducers to consecutively emit direct acoustic impulses into the body of water;
f. detecting with each transducer the resultant reflected sound wave produced by its direct acoustic impulses;
g. separately recording the reflected sound waves detected by said transducers;
h. comparing a difference between the separately recorded reflected sound waves;
i. using the results of the comparison to pilot the sled toward said pipeline;
j. applying electric waves to the other two of said transducers to cause the same to consecutively emit direct acoustic impulses into the body of water;
k. detecting with each one of said other two transducers the resultant reflected sound waves produced by its direct acoustic impulses;
l. separately recording the reflected sound waves detected by said other two transducers; and
m. comparing a difference between the separately recorded reflected sound waves from said two other transducers; and
n. using the results of the comparisons obtained from steps (h) and (m) to position said sled over and astride of said pipeline.

4. The method of claim 3, and discontinuing the steps (i) through (n), inclusive, after the sled is astride of said pipeline, and using the results of the comparison provided by step (h) to move said sled along said pipeline.

5. A system for locating an acoustic reflecting object in a body of water and maneuvering a water-borne structure about said object, comprising:
two pairs of transducers mounted on said structure to form a rectangle therebetween;
transmitter means supplying electric impulses to said transducers to cause selected ones of said transducers to transmit direct acoustic impulses into the body of water;
each transducer detecting the resultant reflected acoustic impulses produced by its direct acoustic impulses;
receiver means coupled to said transducers for selectively receiving the electric outputs therefrom; and
record producing means coupled to said receiver means for producing a record of the output of each transducer; and
navigation means on the surface of said body of water adapted to use said record for piloting said structure relative to said object.

6. The system of claim 5, wherein the direct acoustic impulses from one pair of transducers are directed downwardly and inwardly, and the direct acoustic impulses from the other pair of transducers are also directed downwardly and inwardly.

7. A method of guiding an underwater structure about a submerged, sound-reflecting object, wherein a dual-ranging sonar is mounted on a surface craft that tows the structure, the structure carrying a first pair of spaced-apart, electro-acoustic transducers for consecutively transmitting sound beams into the body of water and for detecting the echoes of the sound beams for recordation by the sonar; characterized in that said beams are directed downwardly and toward each other, and the records made by the sonar are used by the surface craft to maneuver the structure about the submerged object.

8. The method according to claim 7 wherein said records are used to provide a continuous display of the position of said structure relative to said object.

9. The method according to claim 8, wherein said structure carries a second pair of spaced-apart, electro-acoustic transducers; said four transducers are mounted on said structure at the corners of a rectangle; sound beams are consecutively transmitted from said first pair of transducers and their echoes detected by the sonar are used by the surface craft to first locate the object and then to guide the structure toward the object; sound beams are then consecutively transmitted from said first and second pairs of transducers and their echoes detected by the sonar are used by the surface craft to center the structure over the object.

10. A method for remotely maneuvering a pipe-burying sled in a body of water about a pipeline laying on the sea bottom, the sled including two spaced-apart elongated pontoons, wherein a transducer is mounted at the bow end of each pontoon, a sonar navigation system is positioned on a surface craft, said system being coupled to the transducers by a long cable containing electric conductors, electric signals are applied from said sonar to the transducers to cause said transducers to consecutively emit sound beams into said body of water, echoes are detected by the transducers for recordation by the sonar, and the recorded echoes are used to first locate the pipeline and then to maneuver the sled toward and over the pipeline.

11. The method according to claim 10, wherein when said sled is over the pipeline, electric signals are applied to another pair of transducers mounted at the stern ends of said pontoons to cause both pairs of transducers to consecutively emit sound beams into the body of water, each transducer detecting the echoes produced by its sound beams, the echoes detected by the sonar being used to construct displays of the pipe and of the sea bottom relative to said structure, and the displays being used by the surface craft to center the sled astride of the pipeline.

12. a method of piloting a structure, which is fully submerged in a body of water, about a stationary sound-reflecting member which is positioned under said structure, using a dual-ranging sonar system including: at least a pair of transducers mounted on said structure on either side of said member, a transceiver positioned on a craft movable on the upper water surface above said structure, an electric cable coupling said transceiver with said transducers, and monitoring means on said craft coupled to the output of said transceiver, said method comprising:

sending electric pulses from said transceiver through said cable to said transducers;

transmitting direct sound waves from said transducers toward said member;

detecting with said transducers the return sound waves reflected from said member;

sending the detected electric signals from said transducers through said cable to said transceiver and thence to said monitoring means;

measuring the respective travel times of the direct and return sound waves between said transducers and said member;

converting the measured travel times into corresponding distances between said transducers and said member;

constructing a visual display of the position of said structure relative to said member; and piloting said structure about said member with the aid of said display.

* * * * *